March 20, 1956 L. DUFOUR 2,738,846
BRAKE OPERATED BY STEERING MECHANISM
Filed March 19, 1951 5 Sheets-Sheet 1

Inventor
Leon Dufour
By Robert E Burns
Attorney

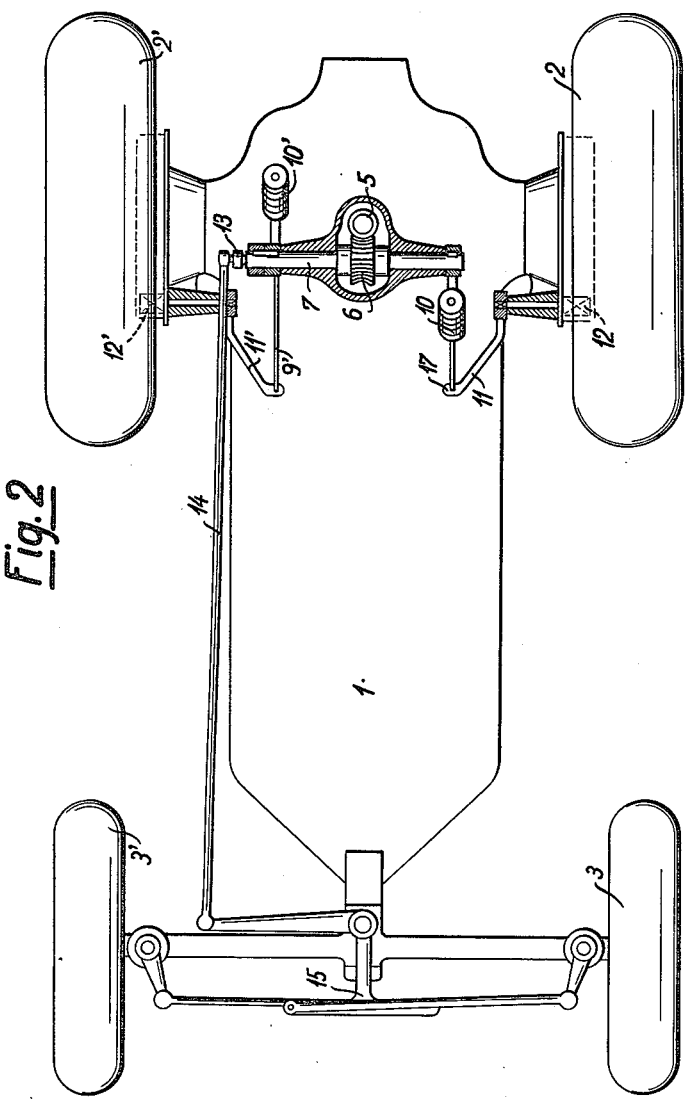

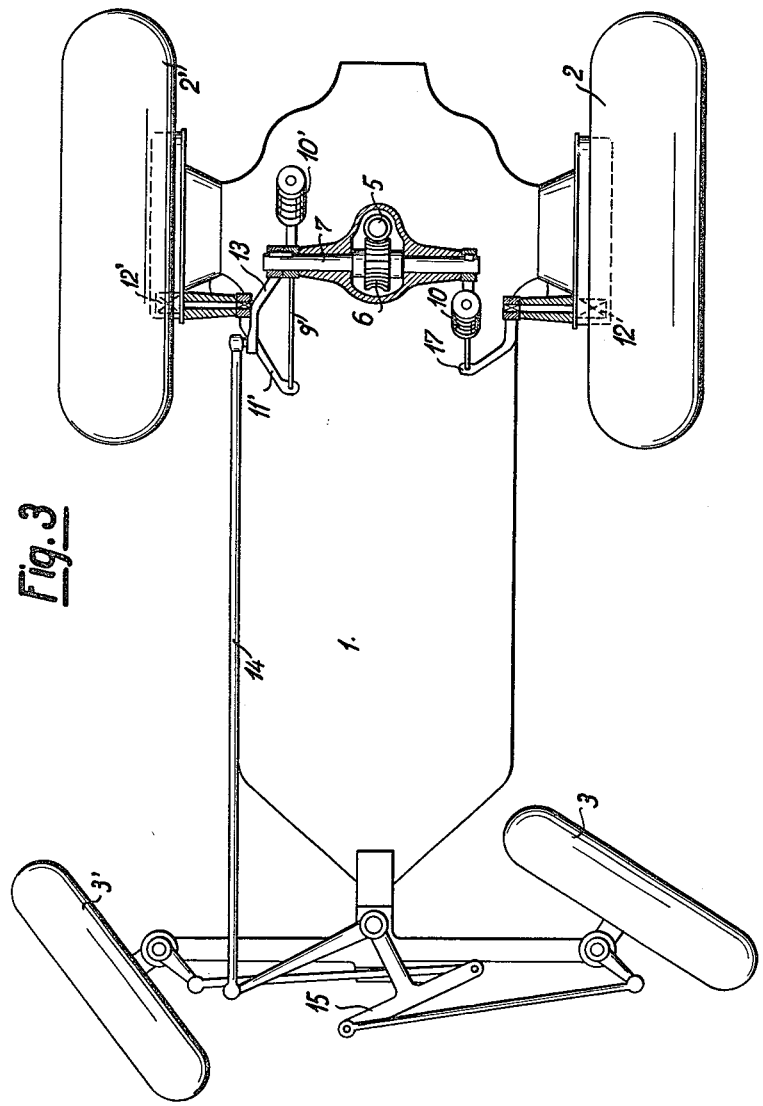

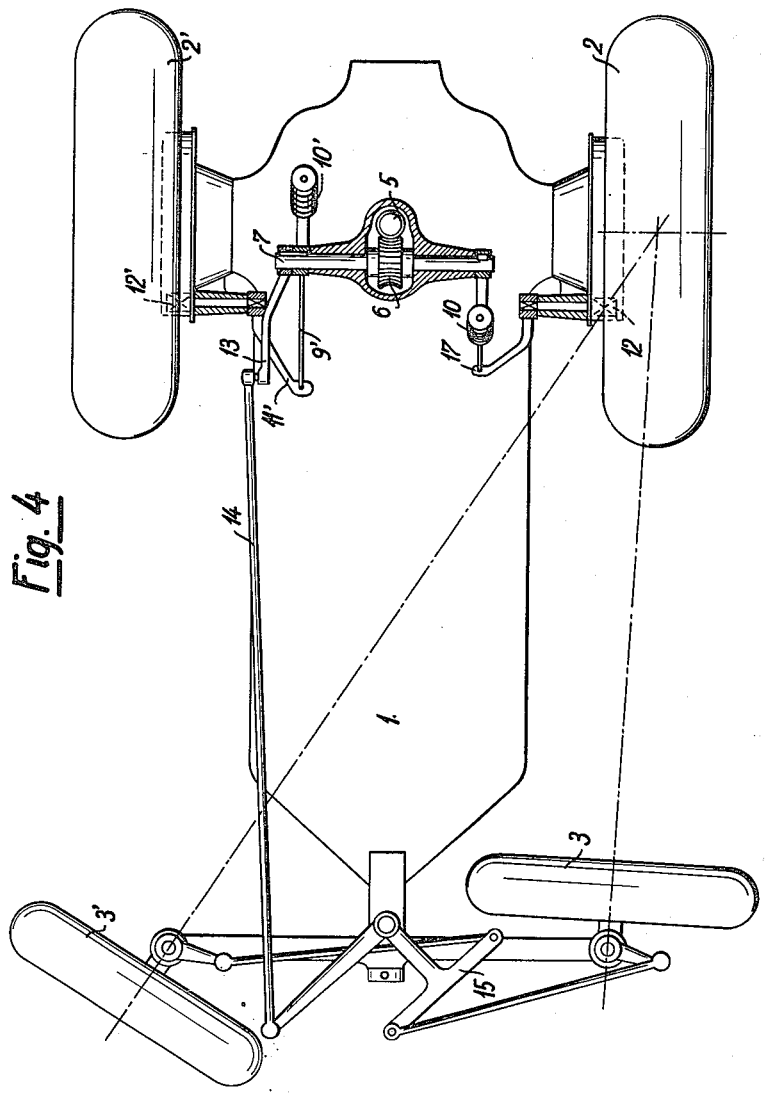

March 20, 1956 L. DUFOUR 2,738,846
BRAKE OPERATED BY STEERING MECHANISM
Filed March 19, 1951

Inventor
Leon Dufour
By Robert E. Burns
Attorney

United States Patent Office 2,738,846
Patented Mar. 20, 1956

2,738,846

BRAKE OPERATED BY STEERING MECHANISM

Léon Dufour, Geneva, Switzerland

Application March 19, 1951, Serial No. 216,291

Claims priority, application Switzerland March 29, 1950

1 Claim. (Cl. 180—6.36)

The object of the present invention is to provide a device enabling an agricultural or road tractor to effect turns of very short radius easily by braking the rear driving wheel on the inside of the turn, by the action of the steering hand-wheel only, that reinforces the effect of the deviation of the front wheels. Several proposals have already been made for such devices. One of the latest mechanisms proposed consists in so arranging the front wheels as to be capable of moving about a pivot, like the castors of an arm-chair, so that they can assume their direction spontaneously, and also in controlling them, by means of the steering hand-wheel of the tractor, only over a certain angle to the right and to the left of their neutral position for forward movement. When this angle is reached a mechanical device automatically disconnects the front wheels from the steering hand-wheel, whereas the hand-wheel, on turning further, locks the brake of the rear driving wheel on the inside of the turn. At the instant when this rear wheel is locked by its brake, the steering hand-wheel itself is also locked. But the front wheels, having become free to rotate about their pivots, assume the correct direction spontaneously, like the castors of an arm-chair. This system operates perfectly satisfactorily, and a tractor constructed in this way can easily be turned about the centre of its rear tire, with a radius of gyration equal to zero, by simply turning the steering hand-wheel as far as it will go. But this arrangement has the disadvantage of being complicated, and consequently relatively expensive.

A further object of the present invention is to provide a much simpler and consequently less expensive arrangement, which likewise renders it possible to make a turn with a radius of gyration equal to zero by simply turning the steering hand-wheel, even in a case where the ground provides only the worst possible grip for the front wheels.

In the device according to the invention, in which the front wheels of the tractor are controlled by the steering hand-wheel by means of one of the known mechanisms rendering possible maximum deviation and the turning of the tractor about the centre of one of the rear driving wheels, the steering wheel is at the same time connected to one or the other of the separate brakes acting on the rear driving wheels, in such a way that the rotation of the steering wheel in either direction controls the braking of the driving wheel on the inside of the turn, this connection being effected through the intermediary of resilient members sufficiently strong to be capable of transmitting the locking force of the brakes.

Another object of the present invention is to ensure that after one of the brakes has been locked the steering wheel will still be capable of turning further in order to bring the front wheels into their position of maximum deviation.

It is clear that theoretically, in order to obtain the best possible results, the connection device between the steering wheel and the brakes would have to be such that braking increases progressively in dependence upon the deviation of the front wheels, and that braking is not complete until the exact moment when the front wheels have reached maximum deviation. It is of course impossible in practice to construct a mechanism as accurately adjusted as this, more especially since the intensity of braking depends on varying extraneous conditions, such as the state of the brake shoes, and also the state of the ground and the effectiveness of the grip of the tires on this ground. But experience has proved that there is no need to maintain an exact relationship between the deviation of the front wheels and the braking of the rear driving wheel on the inside of the turn. Experience has shown also that it is only necessary for this rear wheel to be locked by its brake a little before the front wheels reach their position of maximum deviation, to ensure that this locking of the rear wheel will be effected in all cases, whatever may be the state of the ground or the braking condition of the brake shoes.

The invention enables this particular object to be achieved in an extremely simple manner. According to the invention all that is necessary is to interpose a sufficiently strong resilient member in the mechanism for controlling the brakes by the steering wheel, and to adjust this mechanism in such a way that the locking of the rear wheel will be effected, through the intermediary of this resilient member, a little before the front wheels have reached their position of maximum deviation. The resilient member therefore must be capable of transmitting a force corresponding to this locking, and on the other hand it must be capable of being compressed further to enable the steering wheel to continue to turn after the locking of the brake, and thus bring the front wheels into their position of maximum deviation. Provided that both these conditions are fulfilled, the turn with a zero radius is quite satisfactorily effected by the tractor as soon as the steering wheel is turned to the limit in either direction.

It will be advantageous, in order to avoid unecessary wear on the brakes, to allow the front wheels to deviate through a certain angle, which may vary for instance between 20° and 40° to the right and to the left of their neutral position for forward movement, before beginning to apply the brake, since it is well known that for small angles the deviation of the front wheels is sufficient to steer the tractor, it being unnecessary to use the brakes of the driving wheels, even if the adhesion weight of the front wheels on the ground is relatively slight.

The annexed drawings show, by way of examples, specific embodiment of the invention.

Figure 2 is a plan view, with a sectional part, of the same tractor moving forward in a straight line;

Figure 3 is a plan view, with a sectional part, of the same tractor, in which the steering hand-wheel has been turned to the left until the brake of the left rear driving wheel has been locked;

Figure 4 is a plan view, with a sectional part, of the same tractor, in which the steering wheel has been turned to the left until the front wheels have assumed their position of maximum deviation;

Figure 1:
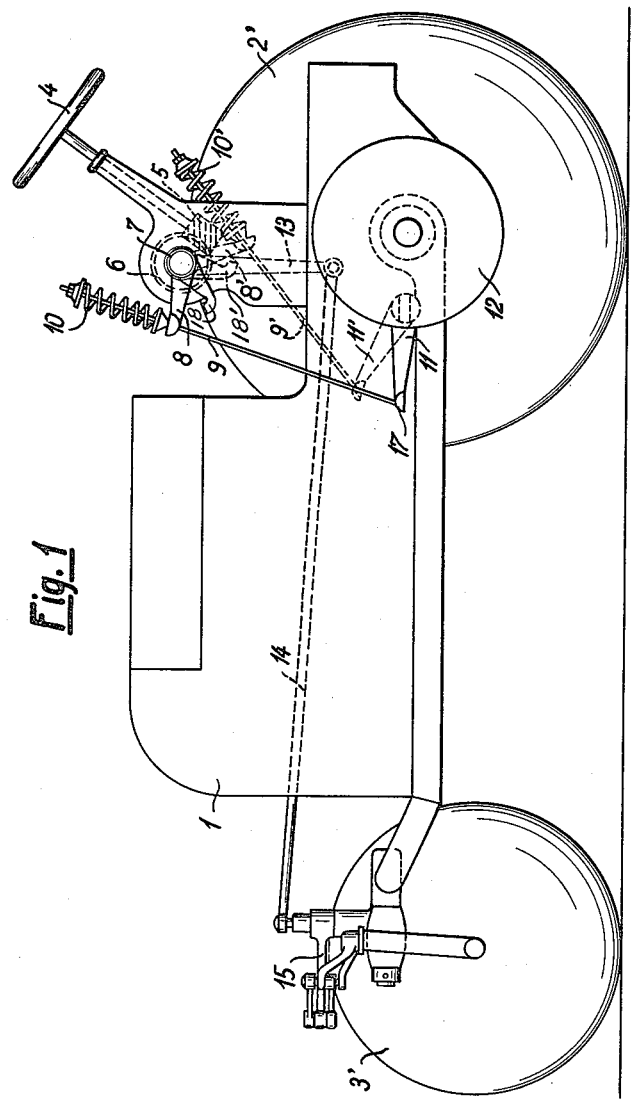
Figure 1 is a view of the embodiment of the tractor in side elevation, in which the left front and rear wheels have been omitted for the sake of clarity.

In Figures 1 to 4, 1 diagrammatically represents the hood surrounding the engine and the gear-box of the tractor, 2 and 2' its rear wheels and 3 and 3' its front wheels on the left and right hand sides respectively. The left wheels 2 and 3 have been omitted in Figure 1 for the sake of clarity. The steering hand-wheel 4 actuates a worm 5 which engages a worm wheel 6. This worm wheel drives the shaft 7. On this shaft are pivoted levers 8 and 8' which operate the brakes 12 and 12' of the rear wheels through the intermediary of resilient members consisting of springs 10 and 10', control rods 9 and 9' and brake levers 11 and 11'. On the other hand, to the right-hand end of the shaft 7 is keyed a lever 13, which controls a controlling rod 14 which actuates the front wheel steering gear 15. This mechanism is of one of the known types allowing maximum deviation of the front wheels, which maximum deviation enables the two front wheels to assume a position in which their axes of rotation intersect at the centre of the rear wheel which is on the inside of the turn, about which centre is effected a gyration of radius zero, as is very clearly seen in Figure 4.

Figure 7:
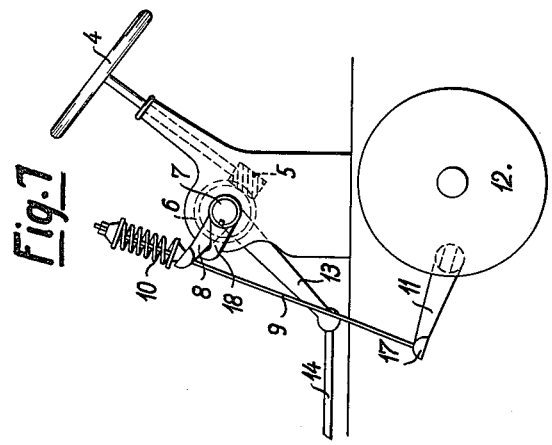
Figs. 5, 6, 7, illustrate in elevation the details of the steering mechanism by which the steering wheel controls the brake of the left rear wheel in the same tractor.
Figure 6:
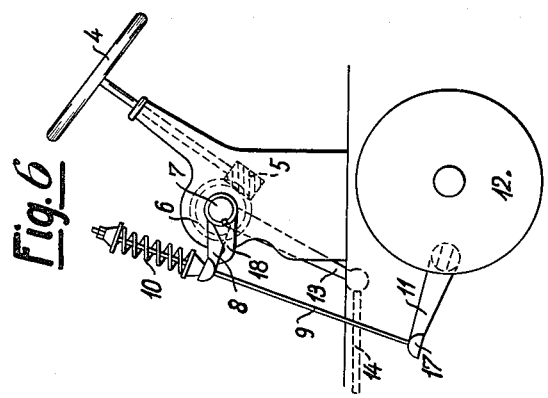
Figure 5:
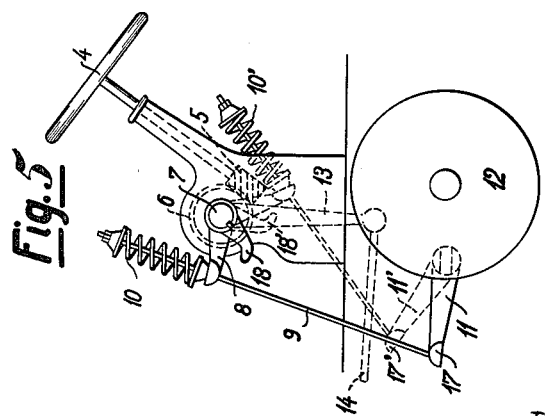

Figures 5, 6 and 7 illustrate the steering mechanism in the same three positions, corresponding to those positions of the tractor as a whole which are shown in Figures 1, 3 and 4 respectively. As shown in Figures 5, 6 and 7, the lever 8 is not keyed to the shaft 7 of the worm wheel but is pivotally mounted on this shaft.

As can be seen a curved finger 18 is keyed to the extremity of the shaft 17. In the position shown in Figure 5, in which the front wheels are in their neutral position for forward movement (as in Figure 1), this finger 18 does not bear against the lever 8, and the steering wheel has to rotate a certain distance before this finger will bear against the lever 8 and begin to actuate it. It will be noted that if the steering wheel is turned to the right in order to turn the front wheels to the right and to brake the right rear wheel, the finger 18 will be able to turn backwards without being hindered in any way. It is obvious that the right-hand side of the mechanism, which is sufficiently illustrated in Figures 1 to 4 and is shown in dotted lines in Figure 5, is similar to the left-hand side, except that it is symmetrically on the other side of the plane passing approximately through the shaft 7 and through the extremities 17 and 17' of the brake levers 11 and 11', so that while the lever 8 which actuates the brake 12 of the left rear wheel of the tractor, in the view in elevation shown in Figure 1, is directed towards the left, the lever 8' which actuates the brake 12' of the right-hand wheel of the tractor will be directed towards the right, in the same figure. The controlling rods 9 and 9' will pass one on each side of the shaft 7, the controlling rod 9 being on the left of this shaft and above it, and the controlling rod 9' on the right and below it.

It would be easy to devise other mechanical arrangements, for connection between the steering wheel and the rear wheel brakes, which would also effectively embody the principle of the invention. The mechanism described hereinabove has been chosen only by way of a particularly simple example.

What I claim is:

Steering and braking means for vehicles of the type comprising rear driving wheels, brake means therefor comprising brake control levers, a steering mechanism comprising a steering wheel of the worm and worm-wheel type and a shaft for said worm-wheel arranged parallel to the rear axle, front wheels operatively and continuously connected through a steering linkage with said steering mechanism, and means for simultaneously braking one of the rear driving wheels, when the steering mechanism is operated, said means comprising a pair of fingers keyed to the shaft of the worm-wheel, a pair of levers freely pivoted on said shaft, said fingers operating said levers for transmitting power from said steering mechanism, brake actuating rods for operating said brake means operatively connected with said brake control levers and passing freely through the extremities of said freely pivoted levers, abutments secured to the extremities of said rods, coil springs mounted on said rods and bearing on said abutments and on said levers to be compressed upon turning movement of said steering mechanism and thereby to transmit power from said levers to said rods to apply the brakes, said springs being of a resiliency to transmit sufficient power to actuate the brake means fully before reaching total compression, whereby the steering mechanism may continue to turn after the brakes have been fully applied by further compression of the resilient member.

References Cited in the file of this patent

UNITED STATES PATENTS

| Number | Name | Date |
|---|---|---|
| 995,291 | Robinson | June 13, 1911 |
| 1,429,178 | Valentine | Sept. 12, 1922 |
| 1,445,698 | McGoldrick | Feb. 20, 1923 |
| 1,613,865 | Anthony et al. | Jan. 11, 1927 |
| 1,747,122 | Lusse | Feb. 11, 1930 |
| 1,825,220 | Char | Sept. 29, 1931 |
| 2,031,317 | Johnston | Feb. 18, 1936 |
| 2,191,961 | Howell | Feb. 27, 1940 |
| 2,453,417 | Dufour | Nov. 9, 1948 |